Patented Apr. 1, 1947

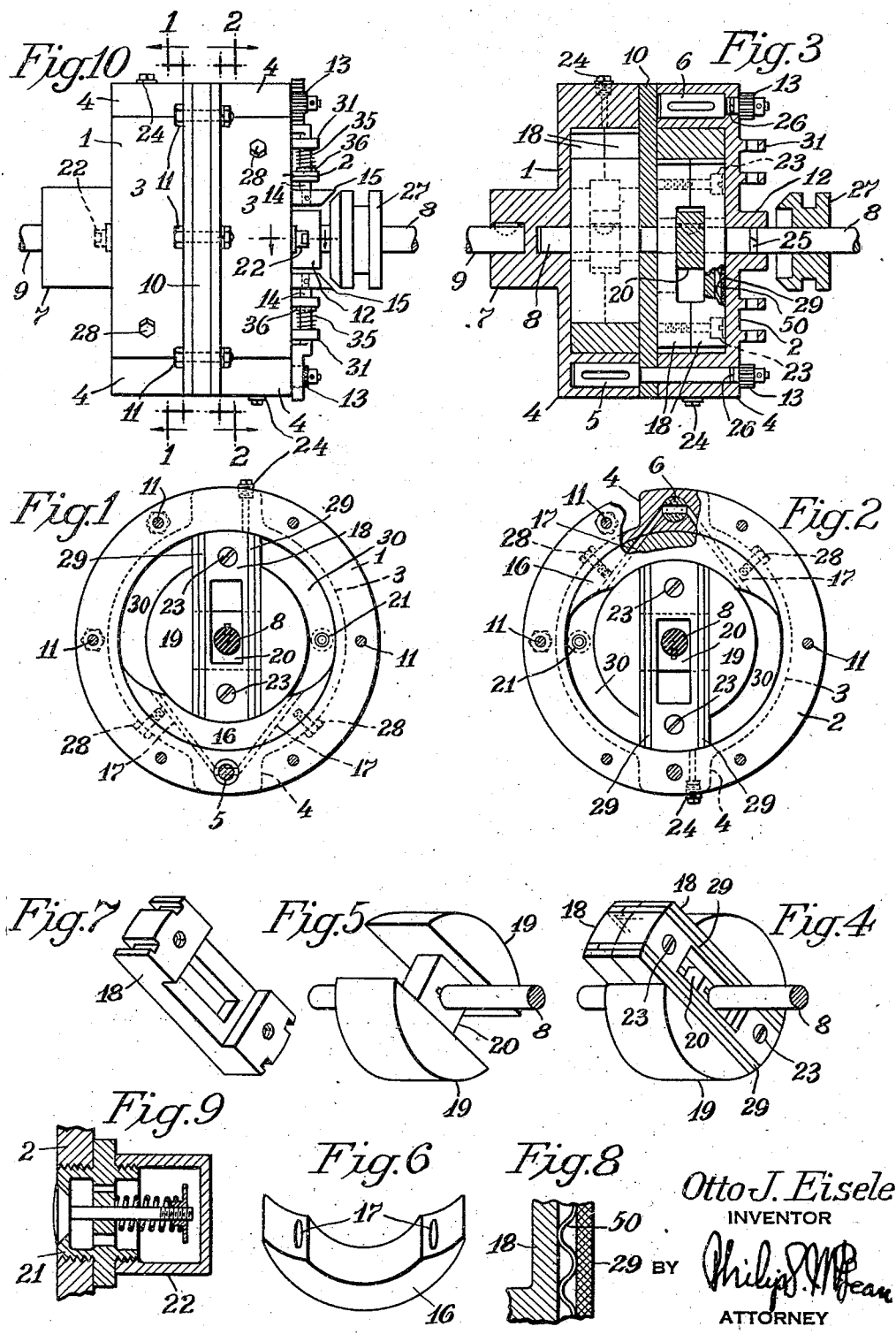

2,418,292

UNITED STATES PATENT OFFICE 2,418,292

MECHANICAL CLUTCH

Otto J. Eisele, New York, N. Y.

Application January 13, 1945, Serial No. 572,594

4 Claims. (Cl. 192—60)

This invention relates to clutches for automobiles, ships, etc., and has for its object to provide a structure which is more simple in construction, and more effective, durable, and reliable in operation than such clutches as heretofore made. This clutch is made operative through the use of a suitable fluid, preferably oil, or air compressed within its compression chambers, or the combination of air compressed and a liquid. Other objects will appear as the description proceeds.

The invention will be first hereinafter described in connection with the accompanying drawings, which constitute part of this specification, and then more specifically defined in the claims at the end of the description.

In the accompanying drawing, wherein similar reference characters are used to designate corresponding parts throughout the several views—

Fig. 1 is an inside face view of a section or member of the casing as appearing on line 1—1 of Figure 10, with a face view of its working parts, some details being shown.

Fig. 2 is a face view, inside face view of the opposite section or member of the casing as appearing on line 2—2 of Figure 10, with a face view of its working parts, some details being shown.

Fig. 3 is a vertical central section of the sections or casing members as shown in Figures 1 and 2, with a separating disc or plate in between. Rotor and sliding piston shown in detail.

Fig. 4 is a perspective and detailed view of a rotor and a sliding piston in combination.

Fig. 5 is a perspective view of a rotor, showing a bridge with its shaft, between its segments.

Fig. 6 is a perspective view of one of the inside cams as shown in Figures 1 and 2, said cams being alternately opposite to each other as also shown in Figure 3.

Fig. 7 is a perspective view of one section or half of one of the sliding pistons.

Fig. 8 is an enlarged broken sectional detail of one of the pressure springs in back of the packing rings on the pistons.

Fig. 9 is an enlarged central vertical section of one of the air intake or suction valves as shown in Figures 1 and 2, one valve cap being shown in Figure 10.

Fig. 10 is an outside view of the complete clutch, unnamed parts to be described as the description proceeds.

The casing of the clutch comprises two supplemental members or sections 1 and 2 each having an annular wall 3 as best shown in Figure 10 said walls 3 having abutments 4 projecting therefrom and located correspondingly opposite to each other as best shown in Figures 1, 2 and 10. The outer end wall of section 1 in Figure 1 has a concentric annular wall 7 extending therefrom, with a bearing at its centre to engage and support the revolving or circular shaft 8, said wall 7 also having at its centre a partition to keep shafts 8 and 9 separated, said shaft 9 being engine driven and securely keyed to clutch as best shown in Figure 3. The outer end wall of section 2 in Figure 2 has a concentric annular wall 12 extending therefrom, with a bearing at its centre to engage and support the shaft 8, said outer end wall also having extending therefrom the sliding rod supports 31 as shown in Figures 3 and 10. The cams 16 illustrated in Figure 5, are securely bolted to the inner circumferences of the two supplemental casing members 1 and 2, after being placed alternately opposite to each other as shown in Figures 1, 2 and 3, bolts 28 placed as indicated to accomplish same, said cams 16, and indicated abutments 4 in Figures 1 and 2 having channels 17 leading to both sides of the circular stop valves 5 and 6, said valves 5 and 6 being incased to revolve in the abutments 4 as best indicated in Figure 3, valve stems of said valves 5 and 6 having gears 13 securely attached thereto, said stems having rings 26 to prevent leakage. Figure 5 is a perspective view of one of the rotors as shown in Figures 1, 2 and 3, each rotor having a bridge 29 between its segments 19 and the shaft 8 securely keyed thereto through its center. Figure 7 is a perspective view of one half of one of the sliding pistons as shown in Figures 1, 2 and 3, both sliding pistons consisting of two halves 18, each half slotted to fit half way round the bridge 20, and having rectangular openings as passages for the shaft 8, said slots and openings being large enough to allow a reciprocating motion of said pistons while the straight edges of said pistons engage and slide over the smaller arcs of the cams 16, said halves 18 being screwed together by means of the screws 23, said pistons being grooved to engage the rings 29, said rings 29 being suitably placed with pressure means such as the bowed or corrugated springs 50, Figure 9, in back of them to prevent leakage between surfaces of the pistons and inside surfaces of the chambers 30, said chambers 30 being shown open in Figures 1 and 2 and completely enclosed in Figure 10. The disk or plate 10 is a common wall throughout the middle of the clutch and separates the casing members 1 and 2 with their parts and thereby closing the chambers 30, said disk 10 having a bearing at its centre to engage the shaft 8, also having bolt holes corresponding to the bolt holes in the flanges of the casing members 1 and 2, and also having an opening to engage the stem of the valve 5, said members 1 and 2 with the disk 10 inbetween being securely bolted together through the use of the bolts 11 as shown in Figure 10. Figure 4 is a perspective view of the rotor as shown in Figures 5 in combination with the sliding piston as shown in Figure 7, the face views of same being shown in Figures 1 and 2 and front view in Figure 3.

The grooved sliding wedge 27 circular in shape is fitted to slide to and fro on the shaft 8, and operated in any suitable manner as means of opening and closing the valves 5 and 6 in unison. The geared rods 14 are meshed with the gears 13, said rods 14 having wedges 15 secured to their inner ends, said rods 14 being supported by the rod supports 31, said rods 14 being encircled by springs 35, said springs 35 resting on pins 36 on one end, and against a rod support on their other ends to insure proper spring action in accordance with the movements of the sliding circular wedge 27, to open and close the valves 5 and 6. The above arrangement is shown in Figure 10. Figure 9 is an enlarged vertical cross section of one of the air intake and check valves 21 as shown in Figures 1 and 2 with a threaded cover 22 in combination; said cover 22 may be used to cause the valves 21 to become inoperative if a liquid is used exclusively in the chambers 30, said valves 21 being securely inserted and placed in or about the position, as indicated. If air is used exclusively, or air and a liquid are used in combination, then the covers 22 are released or removed to allow free suction of air into the chambers 30, as the sliding pistons, in their rotors move away from the valves 21 towards the opposite ends of the chambers 30, and as the straight edges of the sliding pistons engage and slide over the smaller arcs of the cams 16, the said pistons are forced to reciprocate in action within their rotors, regardless of the direction of rotation of either the complete clutch casing or the shaft 8, while the valves 5 and 6 are open, thereby preventing the clutch to grip and hold while the transmission gears are in mesh, and after the valves 5 and 6 are closed, or gradually closed to prevent jerking, the air, after being successively sucked into the chambers 30 through the valves 21, is compressed until the pressure of the air is sufficiently increased to prevent the sliding pistons from moving any more than the resiliency of the compressed air will allow, or such movement as will be caused by leakage, which is insignificant relative to efficiency, with the result that the clutch will hold firmly under a cushioning effect, thereby causing a power engine, after the transmission gears are in mesh to pull whatever is to be driven as an auto, etc. Note that if the compressed air in the chambers 30 is not of sufficient compression to hold the clutch firmly, it will remix with the newly sucked in air, both to be compressed to increase the air pressure, a repetition of the same going on until a sufficient air pressure is attained to firmly hold the clutch. While riding down a hill the air pressure will reverse thereby causing the clutch to act as a brake, and suction will cease until the power to drive or pull forward is resumed. The shaft 8 is grooved to engage a ring 25 to prevent leakage. Bolts 24 are used to close the threaded openings in the abutments 4 as best indicated in the Figures 1 and 2 after being used to fill the chambers 30 with a liquid, if such is desired to make the clutch operative, or used as a means of pouring in a lubricant to insure proper lubrication throughout the entire clutch while the said lubricant, or a lubricant in combination with air, is under pressure in between the sliding pistons and the cams 16 in the chambers 30, said pressure, and centrifugal force, being responsible for proper oil circulation. The possibility exists that a liquid or a lubricant may find its way to the central sections of the sliding pistons and thereby block their reciprocating movements, therefore it should be noted that the rectangular openings thereat are made large enough to allow the said liquid or compressed air to be forced back and forth as a prevention.

This clutch is constructed to insure perfect balancing to prevent vibration, and as an aid to gain a clearer understanding of this invention, fold Figures 1 and 2 towards the disc 10 like closing a book, which will also aid in describing Figures 3 and 10 in true construction. The valves 21 may also be kept closed when air and a liquid are used in combination in the chambers 30 to make this clutch operative. For one example let us assume that half oil and half air are being used in the said chambers 30 while the clutch is in operation. It will be noted that while the air is being compressed between the sliding pistons and the cams 16 a cushioning effect will be created within the clutch, regardless of the direction of revolution of the rotors with their sliding pistons in the casing members 1 and 2. As an aid to efficiency, said oil also acts as a lubricant as already described.

Having thus described my invention, what I claim as new and desire to secure by Letters Patent of the United States is:

1. In a clutch, the combination with a casing having a double compartment, each compartment having a rotor consisting of two segments with a connection bridge inbetween, of a shaft fixed through the centres of said bridges and journaled in the casing, of a sliding piston fitted to slide within said segments, said piston consisting of two halves, each half beng slotted or grooved and having a rectangular opening to allow free motion of the sliding pistons relative to reciprocation, after said halves are loosely assembled over the said bridges and shaft and securely bolted or attached together, and of cams adopted to actuate said pistons, said pistons being grooved with rings shaped in conformity inserted therein, said rings being properly cut with pressure means behind to prevent leakage.

2. In a clutch, the combination of a casing having a double compartment, each compartment having a rotor in combination with a sliding piston fitted therein, of a shaft journaled in the casing and on which the rotors are fixed to rotate therewith, of inside cams fitted and fixed to actuate said pistons, of chambers inside said compartments, toothed rods slidably mounted on said casing, a circular sliding wedge with a circular groove fitted on said shaft, cooperating wedges attached to said toothed rods, gears engaged by the toothed portions of said rods, shut-off valves having stems on which said gears are mounted, supports for said rods projecting from the face of the casing and springs acting on said rods so the shut off valves can be opened and closed in accordance with the action of the circular sliding wedge as operated or controlled, said shut-off valves being mounted in the casing and arranged to control communication between opposite sides of the pistons operating in said compartments.

3. A fully balanced fluid clutch comprising a casing having separate rotor compartments, rotors turning in said compartments, oppositely disposed cams on the inner walls of said compartments, a shaft extending through said compartments, diametrically sliding pistons carried by said rotors in operating engagement with said inside cams, packing rings on said sliding pistons in conforming engagement with the walls of said rotor compartments and inner surfaces of said cams, passages extending convergently from the opposite ends of said inside cams, shut-off valves at the conjunctions of said convergent passages, said valves having valve stems extending to one end of said clutch casing, operating means on the projecting ends of said valve stems and means coaxial with said shaft and connections extending therefrom for effecting actuation of said valve operating means.

4. A fully balanced fluid clutch comprising a casing having separate rotor compartments, rotors turning in said compartments, oppositely disposed cams on the inner walls of said compartments, a shaft extending through said compartments, diametrically sliding pistons carried by said rotors in operating engagement with said inside cams, packing rings on said sliding pistons in conforming engagement with the walls of said rotor compartments and inner surfaces of said cams, passages extending convergently from the opposite ends of said inside cams, shut-off valves at the conjunctions of said convergent passages, said valves having valve stems extending to one end of said clutch casing, operating means on the projecting ends of said valve stems, means coaxial with said shaft and connections extending therefrom for effecting actuation of said valve operating means, air intake check valves opening into said rotor chambers and removable covers for closing said air intake check valves.

OTTO J. EISELE.

REFERENCES CITED

The following references are of record in the file of this patent:

UNITED STATES PATENTS

| Number | Name | Date |
|---|---|---|
| 693,271 | Harding | Feb. 11, 1902 |
| 1,307,697 | Peterson | June 24, 1919 |
| 1,318,199 | Erickson | Oct. 7, 1919 |
| 2,129,108 | Broek | Sept. 6, 1938 |
| 2,195,901 | Owens | Apr. 2, 1940 |

FOREIGN PATENTS

| Number | Country | Date |
|---|---|---|
| 22,408 | French | July 12, 1921 |